United States Patent
Sawarynski, Jr. et al.

(10) Patent No.: US 11,702,019 B2
(45) Date of Patent: Jul. 18, 2023

(54) DAMPER INTERFACE DEVICE

(71) Applicant: Off-Road Research LLC, Farmington Hills, MI (US)

(72) Inventors: Thomas J. Sawarynski, Jr., Livonia, MI (US); Daniel S. Collins, Grass Lake, MI (US)

(73) Assignee: Off-Road Research LLC, Farmington Hills, MI (US)

( * ) Notice: Subject to any disclaimer, the term of this patent is extended or adjusted under 35 U.S.C. 154(b) by 637 days.

(21) Appl. No.: 16/779,589

(22) Filed: Feb. 1, 2020

(65) Prior Publication Data

US 2020/0247336 A1   Aug. 6, 2020

Related U.S. Application Data

(60) Provisional application No. 62/800,437, filed on Feb. 2, 2019.

(51) Int. Cl.
| | |
|---|---|
| *B60R 16/023* | (2006.01) |
| *B60G 17/0185* | (2006.01) |
| *B60G 17/018* | (2006.01) |

(52) U.S. Cl.
CPC ........ *B60R 16/0232* (2013.01); *B60G 17/018* (2013.01); *B60G 17/0185* (2013.01); *B60R 16/0238* (2013.01); *B60G 2400/90* (2013.01); *B60G 2600/08* (2013.01); *B60G 2600/73* (2013.01)

(58) Field of Classification Search
CPC .................. G06Q 2220/14; G05B 2219/34436
See application file for complete search history.

(56) References Cited

U.S. PATENT DOCUMENTS 9,665,418 B2 * 5/2017 Arnott .................... G06F 9/455

OTHER PUBLICATIONS

Hampo, Richard, and Kenneth Marko. "Neural network architectures for active suspension control." IJCNN-91-Seattle International Joint Conference on Neural Networks. vol. 2. IEEE, 1991. (Year: 1991).*

* cited by examiner

*Primary Examiner* — Russell Frejd
*Assistant Examiner* — Ana D Thomas
(74) *Attorney, Agent, or Firm* — Quinn IP Law

(57) ABSTRACT

A damper interface device (DID) includes a microcontroller including a memory and a processor, at least one algorithm stored to the memory, and a DID connector configured to connect the microcontroller to a vehicle network without having to modify the wiring system of the vehicle. The algorithm is configured to receive network messages from the vehicle network via the DID connector, where the network messages include an input message directed to a suspension controller. The algorithm is executed by the processor to identify the input message as directed to the suspension controller, parse the input message for response requirements, determine contents of a response to the input message, where the contents of the response emulate a response of the suspension controller, and generate a response message including the contents of the response. The microcontroller is configured to output the response message to the vehicle network via the DID connector.

26 Claims, 8 Drawing Sheets

DAMPER INTERFACE DEVICE

CROSS-REFERENCE TO RELATED APPLICATIONS

This application claims priority to and the benefit of U.S. Provisional Patent Application No. 62/800,437 filed on Feb. 2, 2019, which is hereby incorporated by reference in its entirety.

TECHNICAL FIELD

The present disclosure relates to a system including a damper interface device (DID) installed to a vehicle to emulate semi-active dampers which have been removed from the vehicle.

BACKGROUND

A vehicle can be originally equipped (OE) by the vehicle manufacturer with a semi-active suspension system, which can include semi-active dampers. The semi-active dampers are in communication with and activated by a controller in the vehicle, such as a vehicle suspension controller, where the semi-active dampers are activated by the suspension controller in response to inputs from one or more sensors in the vehicle, which may include, for example, suspension sensors. The suspension controller of the vehicle is configured to control and/or monitor the suspension system and/or one or more semi-active suspension components such as the semi-active dampers, the suspension sensors, etc. The suspension controller is typically in communication, via a vehicle controller area network (CAN), with another module within the vehicle, such as a cluster module or control module responsible for overseeing the functions of various system controllers, including, for example, the suspension controller. The cluster module can be configured to output a CAN message to the suspension controller, for example, inquiring a condition state of the semi-active system and/or a condition state of a semi-active suspension component. The suspension controller can be configured to output a response message to the cluster module, in response to the CAN message. When the suspension controller responds with an error message or a fault status, and/or does not provide a response, the cluster module can, in response, set a diagnostic code in the vehicle onboard diagnostics (OBD) system of the vehicle diagnostics module (VDM) and/or vehicle network, and/or, the vehicle in response to the fault status, can enter into a reduced performance state. The vehicle is not returned to a normal (unreduced) performance state until the fault status is cleared in the network, for example, by receiving a functional status message from the suspension controller.

SUMMARY

In some cases, a vehicle owner can modify the vehicle to change the feel and/or handling dynamics of the vehicle, for example, based on the vehicle owner's preference, by replacing the OE semi-active dampers with aftermarket installed passive dampers. When the semi-active dampers are removed from the vehicle and replaced with passive dampers, the suspension controller interprets the absence of the semi-active dampers as a fault condition, and reports a fault status to the cluster module, which can also be referred to herein as a vehicle control module. The vehicle, in response to the fault status, enters a reduced performance state, which is undesirable to the vehicle owner. The vehicle cannot be returned to a normal (unreduced) performance state until the fault status is cleared by the cluster module. The cluster module will not clear the fault status until the cluster module receives a functional status message, e.g., a message indicating the semi-active damper system is functional, from the suspension controller. The suspension controller, so long as it is unconnected to the OE semi-active dampers which have been removed from the vehicle, cannot generate a functional status message and will continue to output a fault status to the cluster module in response to a CAN message received from the cluster module.

By installing a damper interface device (DID), such as the DID described herein, to a network of a vehicle which has been modified to replace semi-active dampers with passive dampers, a functional state of the semi-active dampers can be emulated by the DID to the vehicle network, such that the vehicle modified with the passive dampers can be restored to and/or will remain in a normal (non-reduced) performance state, as if the semi-active dampers were still functioning in the vehicle. Installing the damper interface device (DID) to a vehicle, where the vehicle has been modified to replace semi-active dampers with passive dampers, is performed by disconnecting a suspension connector from the suspension controller of the vehicle, and connecting the DID to the suspension connector such that the DID, when installed, is in direct communication with the vehicle network, where the DID is configured to listen for CAN messages received via the network, for example, from a vehicle cluster module and/or vehicle diagnostic module (VDM), and to generate and output a functional status message in response, such that the vehicle continues to function in a normal (unreduced) performance state after removal of the semi-active dampers from the vehicle. In one example, the vehicle cluster module can include and/or be in communication with an on board diagnostics (OBD) module. Advantageously, the DID is configured as a pluggable replacement for the suspension controller, such that the vehicle's suspension connector can be plugged directly into the DID connector without having to modify the OE wiring system of the vehicle.

In an illustrative example, the damper interface device (DID) includes a DID connector configured to connect the microcontroller to a vehicle network and a microcontroller comprising a memory and a processor. The microcontroller includes at least one algorithm stored to the memory, and is configured to receive messages from the vehicle network via the DID connector, where the network messages include at least one input message directed to a suspension controller. The at least one algorithm is executable by the processor to identify the at least one input message as directed to the suspension controller, parse the at least one input message for response requirements, determine contents of a response to the at least one input message, where the contents of the response emulate a response of the suspension controller, and generate a response message including the contents of the response. The microcontroller is configured to output the response message generated by the microcontroller to the vehicle network via the DID connector. The DID can include a network transceiver in communication with the microcontroller and the DID connector, where the transceiver is configured to receive the messages from the vehicle network and to output the response messages to the vehicle network, and to receive an interrupt from the network, where the at least one input message is associated with the interrupt. In one example, the at least one algorithm is executable by the processor to start a response timer upon receiving the input message, where starting the response timer sets an expiration time. The at least one algorithm and/or the microcontroller is configured to output the response message to the vehicle network at the expiration time, such that the response time to each input message is consistent and is the expiration time. The DID can further include a programming module, and the microcontroller can include memory which includes a programmable memory. In one example, the at least one algorithm is stored to the programmable memory via the programming module, and the microcontroller is programmable via the programming module.

In one example, the microcontroller is configured to generate a response message including a condition state which indicates a functional status of the semi-active damper, in response to an input message, where parsing the input message determines the contents of the response comprise a condition state of a semi-active damper. In one example, the DID connector configured to connect the microcontroller to a suspension sensor via a network connector, and to receive a sensor input from the sensor, such that, when the contents of the response comprise a condition state of the sensor, the condition state of the sensor is determined by the at least one algorithm using the sensor input, and the response message generated by the microcontroller includes the condition state of the sensor. In one example, the sensor input can include one or more measurements of a vehicle parameter, such as a ride height, and the response message generated by the controller can include the ride height defined by the sensor input. In one example, the DID can be configured to monitor sensor input received via the suspension connector from one or more sensors on the vehicle, and to output an error message to the vehicle network if an input is received from one of the one or more sensors indicating the sensor is sensing an error state condition and/or operating outside of functional limits.

In one example, the damper interface device can include one or more configuration messages stored to memory, where each respective configuration message includes a respective configuration for a respective vehicle control module of the vehicle. The microcontroller can be configured to detect the respective control module via the vehicle network, and output the respective configuration message to the respective control module, where the respective configuration message is received by the respective control module and executed to reprogram the respective control module from its current configuration to the respective configuration included in the respective configuration message. More than one configuration message can be stored to the memory of the damper interface device, such that the microcontroller can output a second configuration message to the respective control module to reprogram the control module from the first configuration to the second configuration. In one example, the second configuration is equivalent to the configuration which was current at the time the module was reprogrammed to the first configuration, such that, by reprogramming the vehicle control module to the second configuration, the vehicle control module is reprogrammed to the configuration that was current prior to being reprogrammed to the first configuration.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
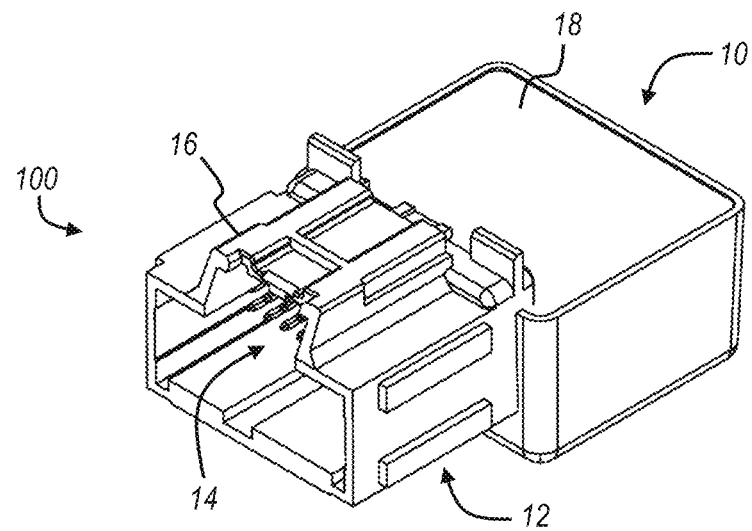
FIG. 1 is a schematic top perspective view of a damper interface device.
Figure 2:
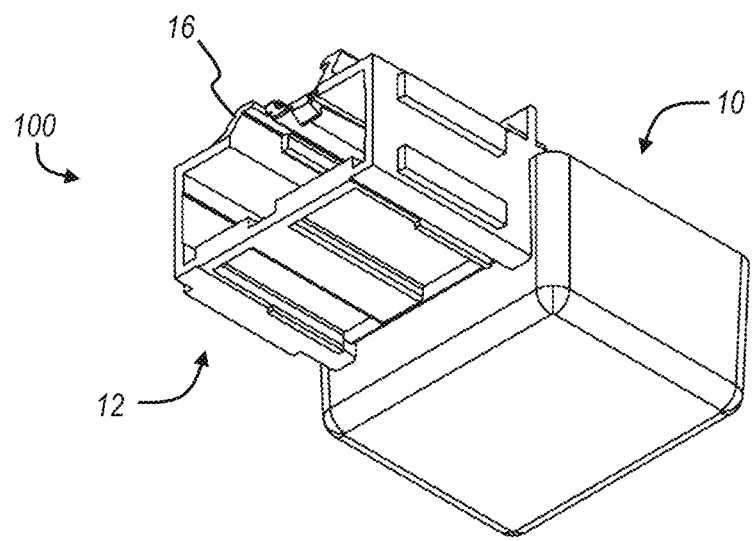
FIG. 2 is a schematic bottom perspective view of the damper interface device of FIG. 1.
Figure 3:
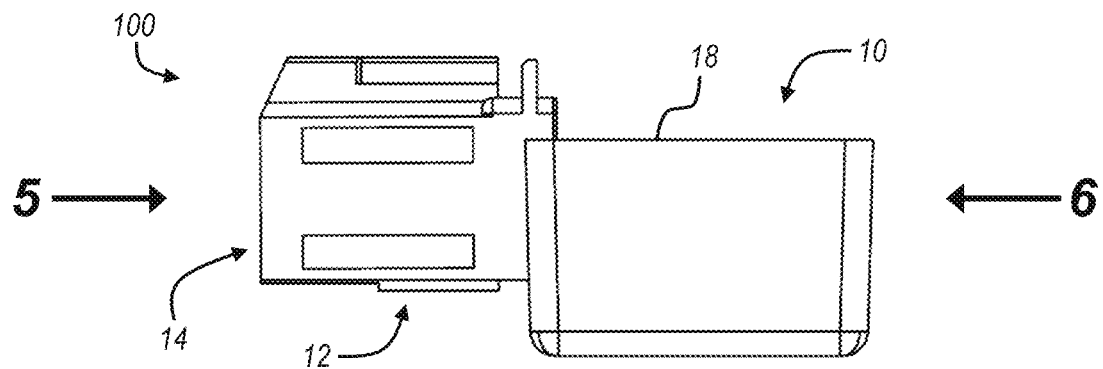
FIG. 3 is a schematic side view of the damper interface device of FIG. 1.
Figure 4:
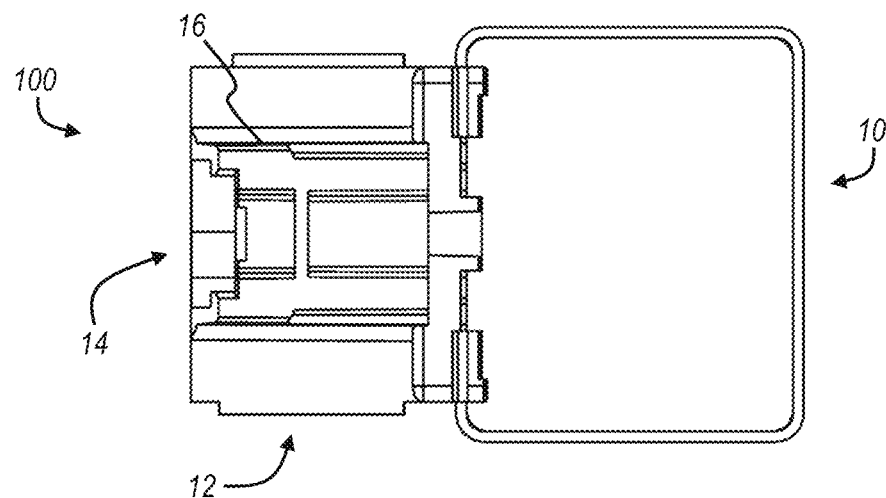
FIG. 4 is a schematic top view of the damper interface device of FIG. 1.
Figure 5:
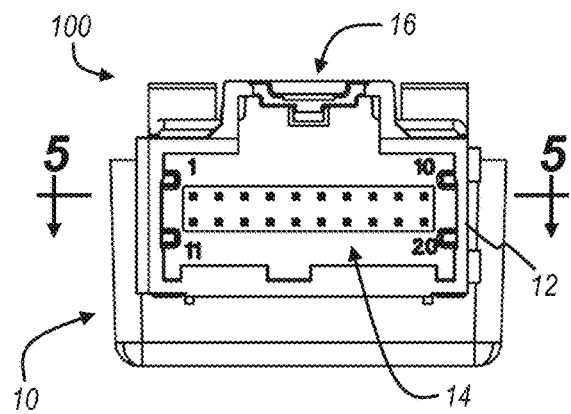
FIG. 5 is a schematic end view of a first end of the damper interface device of FIG. 1.
Figure 6:
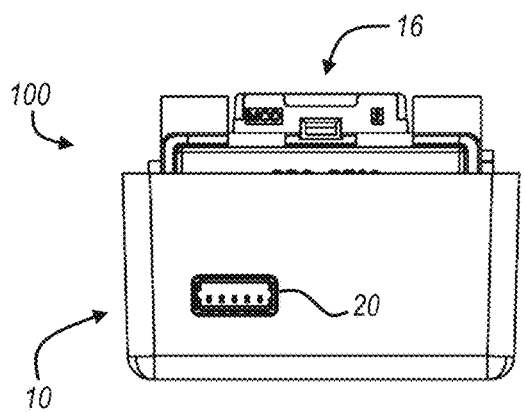
FIG. 6 is a schematic end view of a second end of the damper interface device of FIG. 1.

The elements of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein. Referring to the drawings wherein like reference numbers represent like components throughout the several figures, the elements shown in FIGS. 1-15 are not necessarily to scale or proportion. Accordingly, the particular dimensions and applications provided in the drawings presented herein are not to be considered limiting. The following listing of elements shown in FIGS. 1-15 is provided for reference only, and is not intended to be limiting:

100 Damper interface device (DID)
10 DID housing

12 DID connector
14 DID electrical header
16 Connector latch
18 Mounting surface
20 Programming connector
22 Power management and monitoring (PMM) module
24 Controller Area Network (CAN) transceiver
26 Programming module
28 Analog to Digital Converter (ADC)
30 Microcontroller Unit (MCU)
32 MCU memory
34 MCU processor
36 Suspension controller
38 Network connector
40 Emulation algorithm (including steps 42-48)
50 Emulation algorithm (including steps 52-58)
60 Emulation algorithm (including steps 42-48 and 62-70)
72 Vehicle
74 Suspension connector
76 Cable assembly
78 Suspension electrical header
80 Vehicle network
82 Vehicle diagnostics module (VDM/OBD)
84 Vehicle control module(s)

Figure 8:
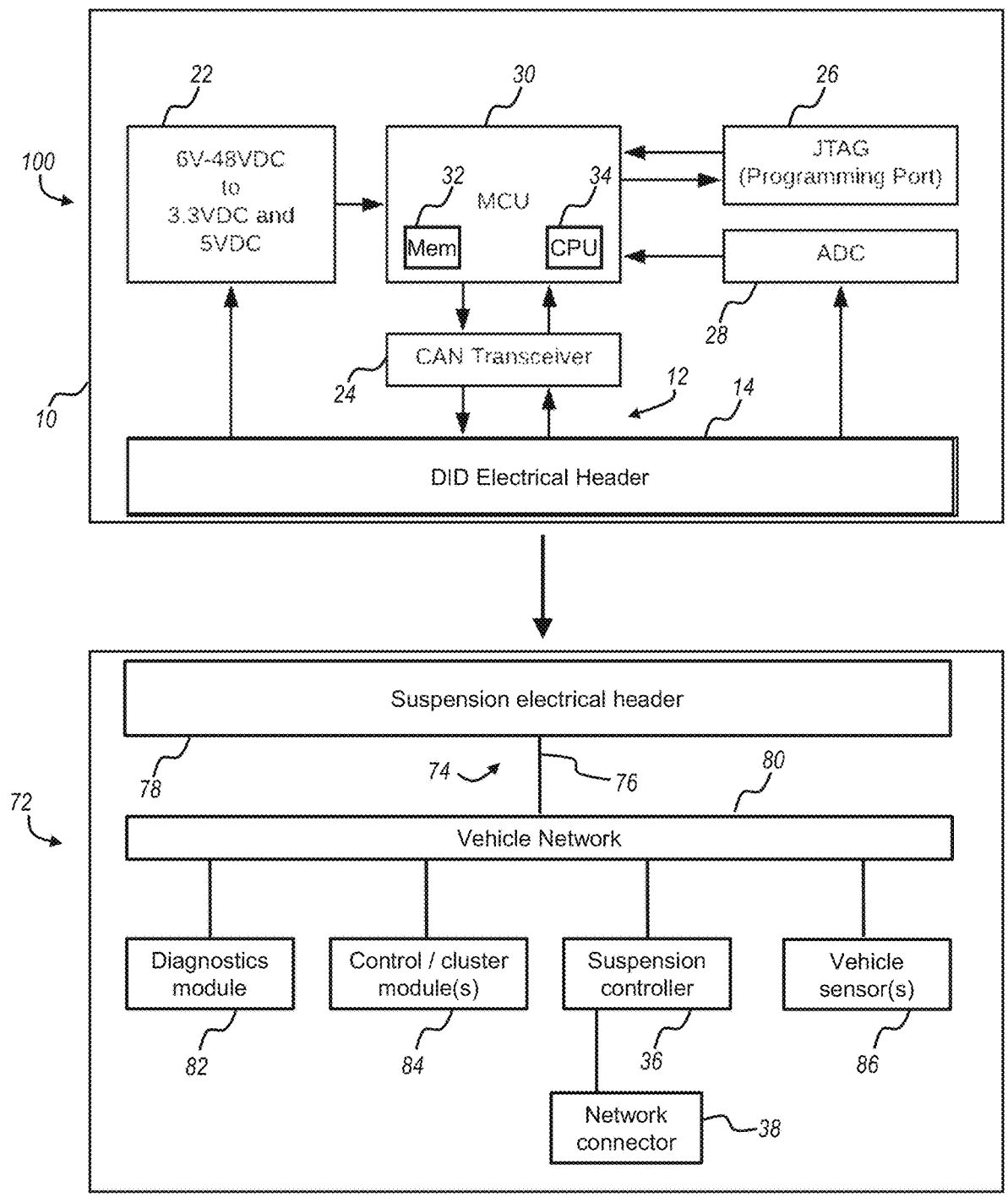
FIG. 8 is a schematic illustration of a block diagram flow chart of the damper interface device of FIG. 1 connected to a vehicle network.
Figure 9:
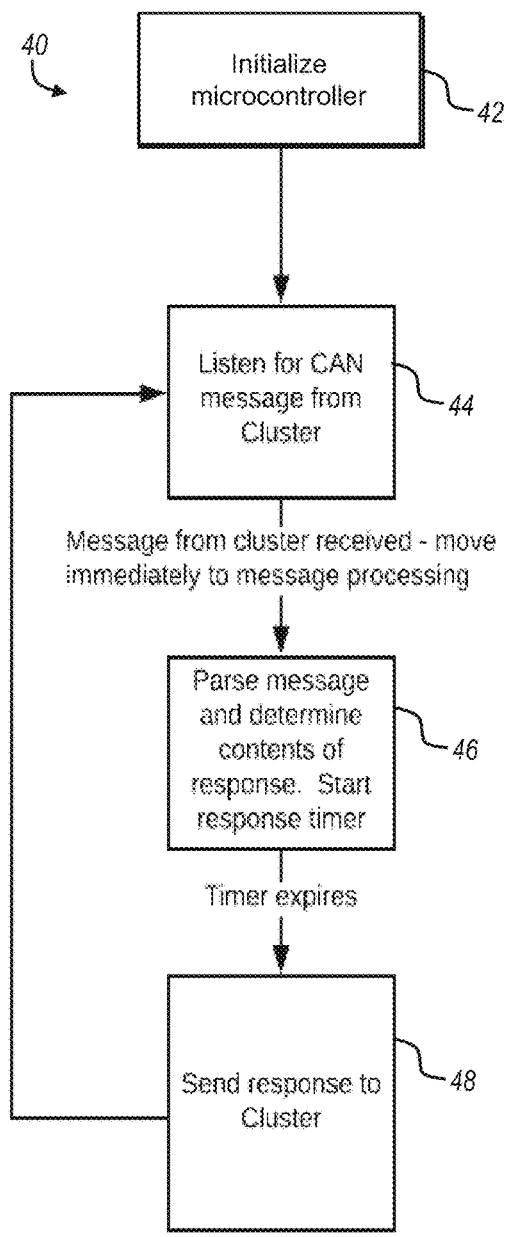
FIG. 9 is an illustration of an example of an emulation algorithm executable by the damper interface device of FIG. 1.
Figure 10:
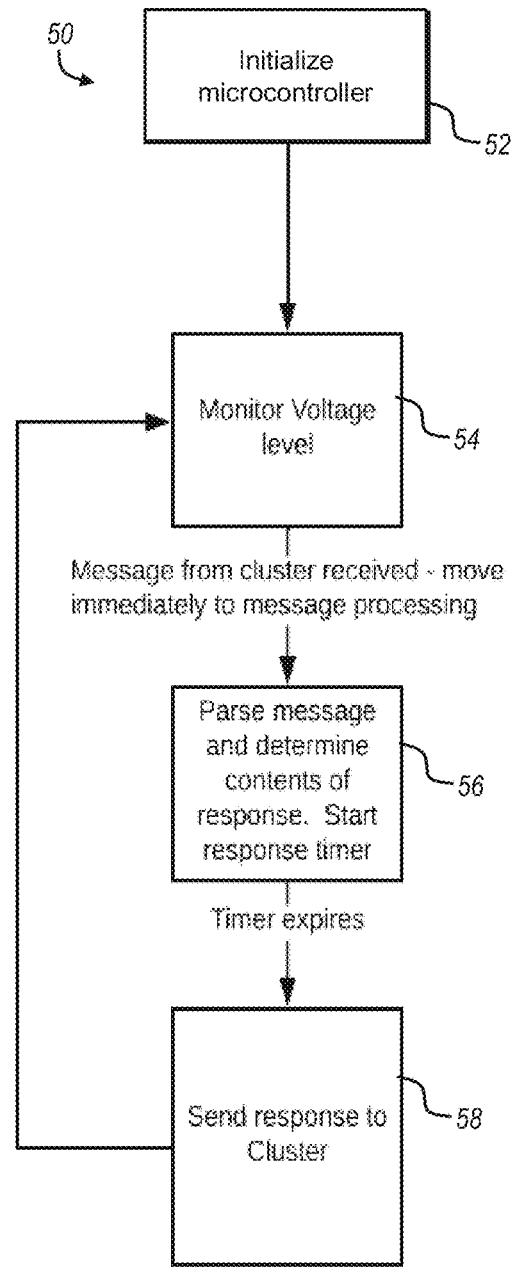
FIG. 10 is an illustration of another example of an emulation algorithm executable by the damper interface device of FIG. 1.
Figure 11:
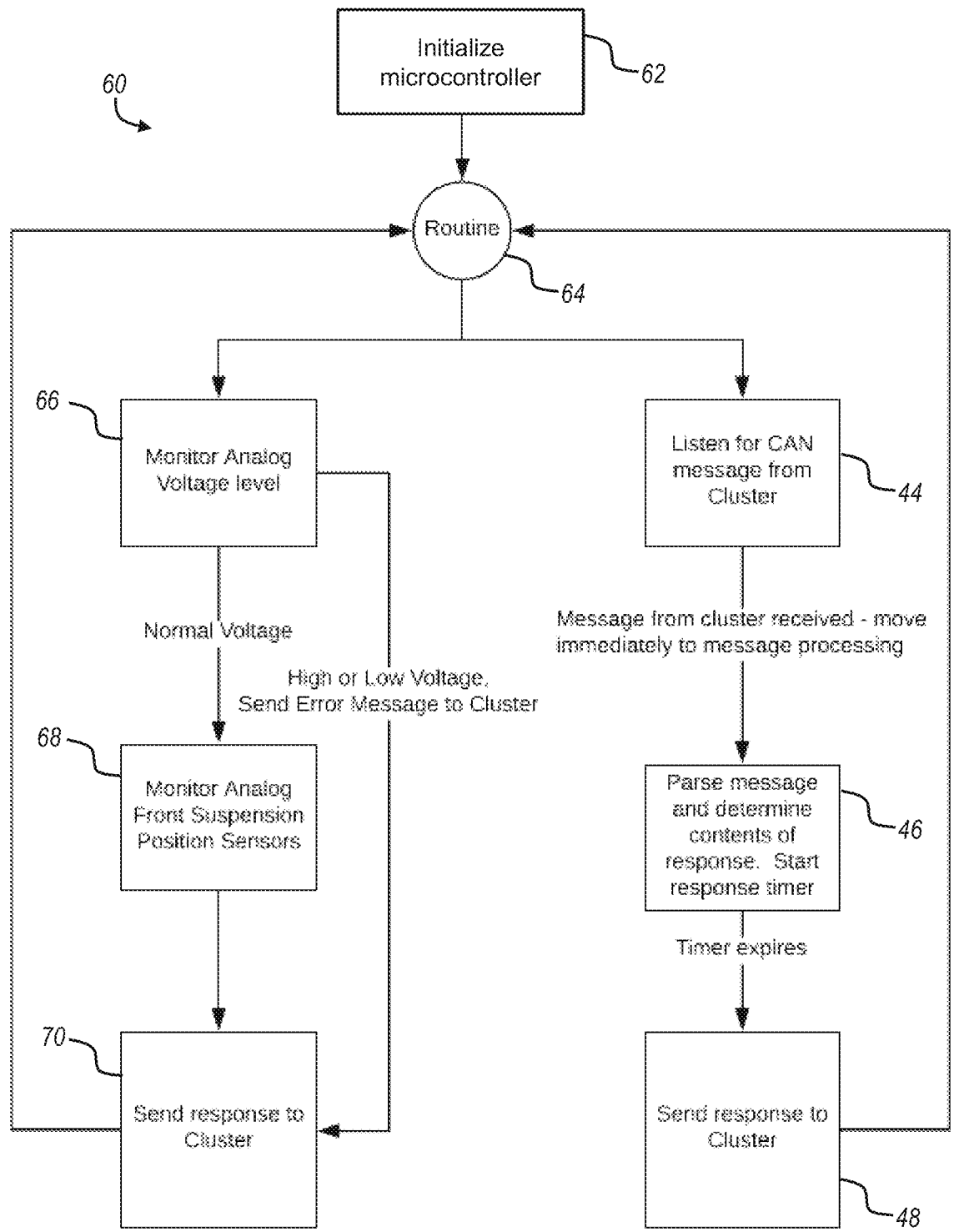
FIG. 11 is an illustration of another example of an emulation algorithm executable by the damper interface device of FIG. 1.

Referring to FIGS. 1-15, wherein like reference numbers represent like components throughout the several figures, FIGS. 1-11 and FIGS. 13-15 show a damper interface device (DID) 100 configured for installation to a vehicle network 80 of a vehicle 72, where the vehicle 72 has been modified by removal of a set of original equipment (OE) semi-active dampers from the vehicle, and replacement of the OE semi-active dampers with a set of aftermarket passive dampers, where the DID 100 is configured to emulate the set of semi-active dampers to the vehicle network 80, using one or more algorithms, including for example, one or more of the algorithms 40, 50, 60 shown in FIGS. 9-11. The vehicle network 80 can be configured, for example, as a controller area network, also referred to as a CAN network 80. A set of dampers, as referred to herein, can include a left front damper and a right front damper, or can include a left rear damper and a right rear damper.

Figure 12:
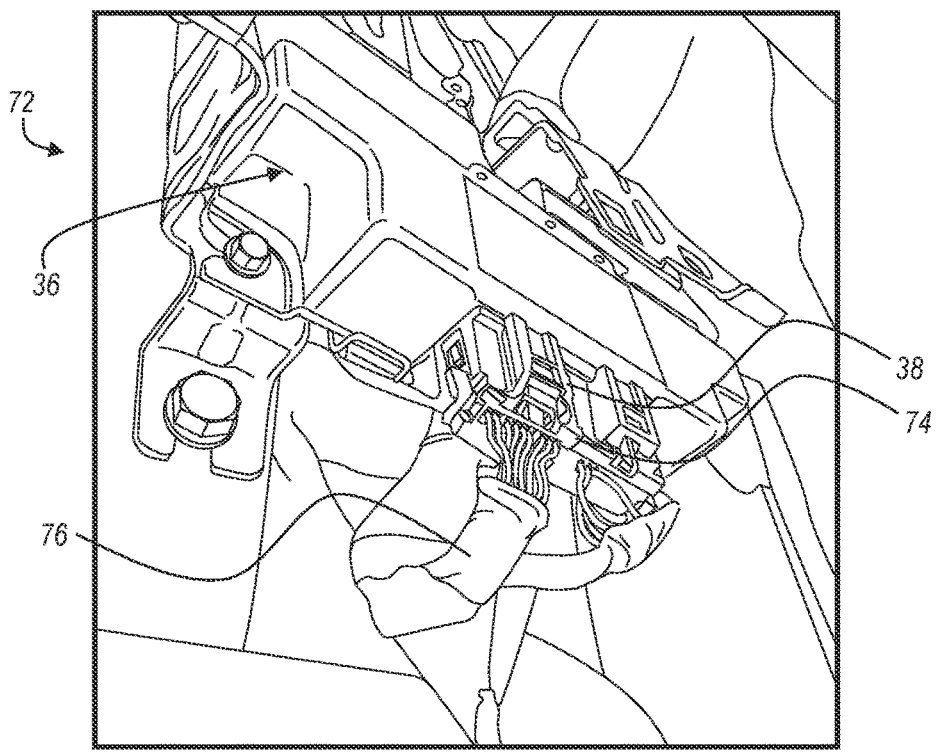
FIG. 12 is a schematic perspective illustration of a vehicle suspension controller connected to the vehicle network via a suspension connector.

Referring to FIGS. 8 and 12, as originally installed, the example vehicle 72 includes a set of semi-active dampers (not shown) and one or more suspension sensors 86, a suspension controller 36 including a network connector 38, and a cable assembly 76 including a suspension connector 74. Each of the semi-active dampers can include, for example, a solenoid for activating the semi-active damper. As originally installed, each of the semi-active dampers, via its solenoid, and each of the suspension sensors 86, are connected to the suspension connector 74 via one or more cables included in the cable assembly 76. The cable assembly 76 can further include one or more power cables, one or more communication cables for messaging with the vehicle network 80, and one or more sensor cables for communicating with one or more suspension sensors 86. As originally installed, the suspension controller 36 is connected to the vehicle network 80 by connecting the suspension connector 74 to the network connector 38 of the suspension controller. As originally installed, the suspension controller 36 outputs control signals to the semi-active dampers and receives input from the semi-active dampers and, in one example, from suspension sensors 86 installed on the vehicle. As originally installed, the suspension controller 36 is configured to monitor the semi-active dampers and the sensors 86 for fault conditions, and output error messages to the network 80 if a fault condition is sensed. As originally installed, the suspension controller 36 is configured to monitor the network 80 for an input message from the network 80, where the input message may request a response message from the suspension controller 36. In one example, the input message can request response message from the suspension controller 36 indicating the semi-active dampers are in one of a functional status and a fault status. In one example, the input message can request response message from the suspension controller 36 based on sensor input received from the one or more suspension sensors 86 connected to the suspension connector 74.

Figure 13:
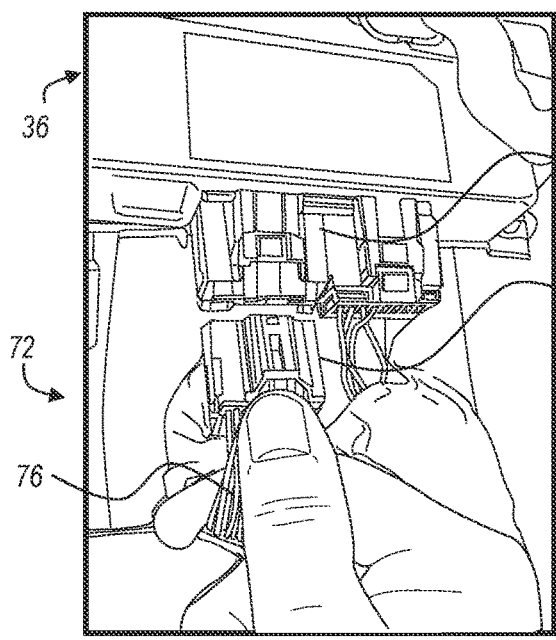
FIG. 13 is a schematic perspective illustration showing disconnection of the suspension connector from the suspension controller.
Figure 14:
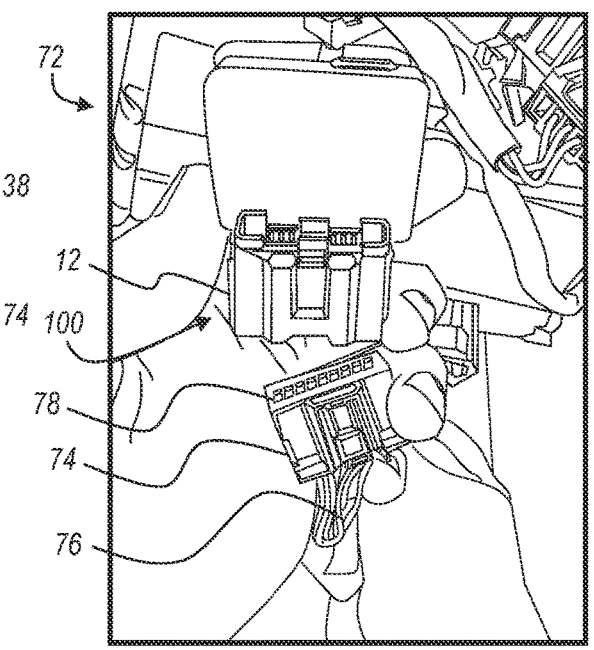
FIG. 14 is a schematic perspective illustration showing connection of the suspension connector to the damper interface device of FIG. 1.
Figure 15:
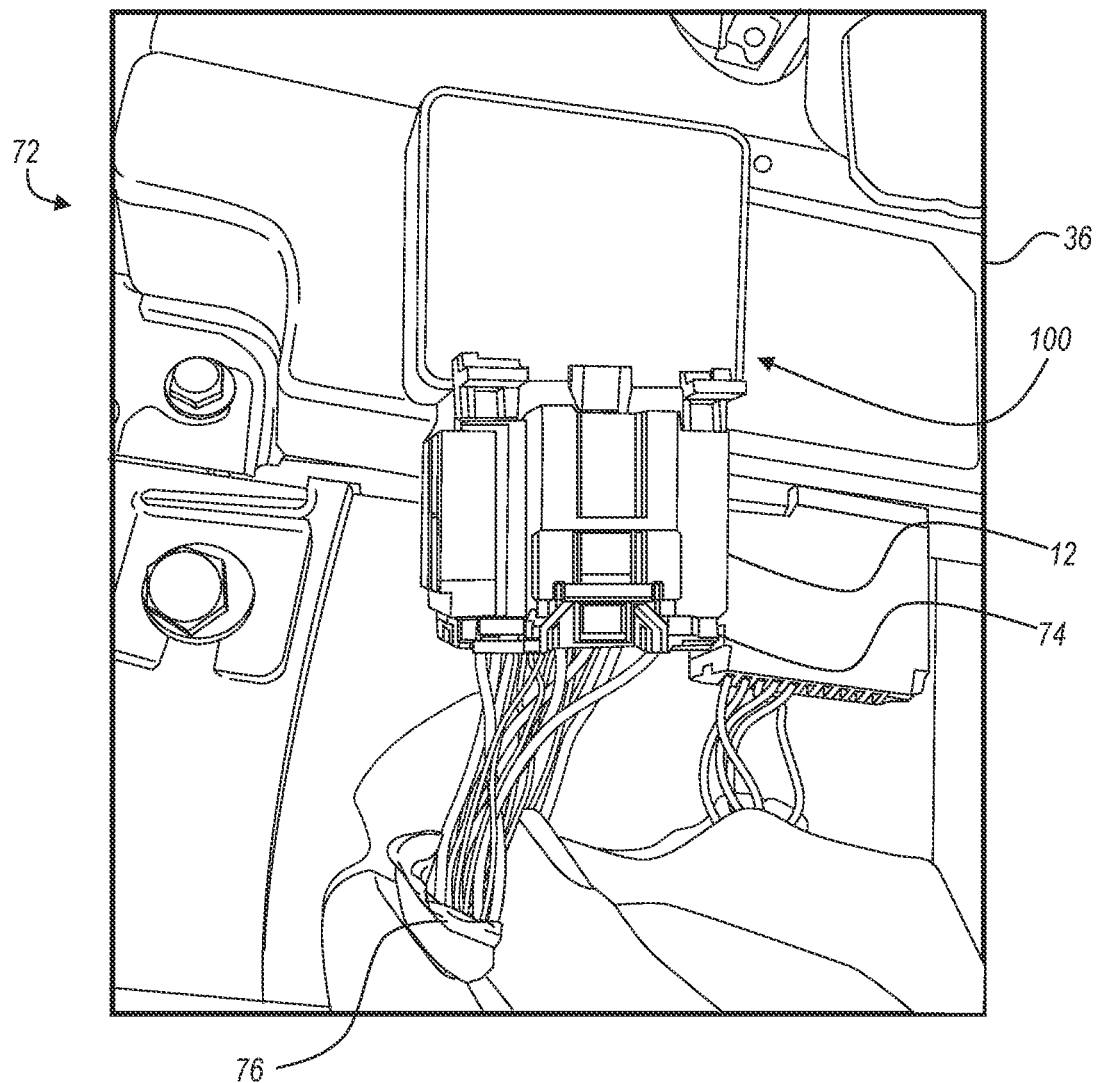
FIG. 15 is a schematic perspective illustration showing the damper interface device of FIG. 1 connected to the suspension connector and installed in the vehicle, such that the damper interface device is connected to the vehicle network via the suspension connector.

Referring to FIG. 8 and the schematic illustrations shown in FIGS. 13-15, during modification of the vehicle 72 to install a set of passive dampers (not shown), the cables of the cable assembly 76 which connect to the semi-active dampers, e.g., the damper cables (not shown), are disconnected, and the semi-active dampers are removed from the vehicle 72, such that no signal is transmitted through the disconnected damper cables of the cable assembly 76, which can cause the suspension controller 36 to generate an error message and/or to output a fault status, which in turn can cause the vehicle 72 to enter into a reduced performance state until the network 80 receives a functional status message for the semi-active dampers. To enable a fully functional vehicle state after the semi-active dampers have been removed and the passive dampers have been installed, e.g., to restore and/or maintain the vehicle in a normal (un-reduced) performance state, the suspension connector 74 is disconnected from the network connector 38 of the suspension controller 36 (see FIG. 8 and FIG. 13) and connected to the DID connector 12 of the DID 100 (see FIG. 8 and FIGS. 14-15) such that the DID 100 can emulate, as further described herein, the suspension controller 36 in responding to messages received via the suspension connector 74 from the vehicle network 80. The DID 100 interfaces via the vehicle network 80, including, for example, the vehicle onboard diagnostics (OBD) network including, for example, a vehicle diagnostics module (VDM) 82, using, for example, Controller Area Network (CAN) communications protocol. The DID 100 queries the onboard diagnostics network and/or the VDM 82, and upon receiving a message, parses the message and responds with the appropriate (emulated) operating status message for the condition state requested, where the operating status message can indicate an emulated functional status of the removed semi-active damper. In this manner, the vehicle 72 continues to function in a normal (unreduced) performance state after removal of the semi-active dampers from the vehicle 72. Advantageously, the DID 100 is configured as a pluggable replacement for the suspension controller 36, such that the suspension connector 74 can be plugged directly into the DID connector 12 without having to modify the wiring system of the vehicle 72.

Figure 7:
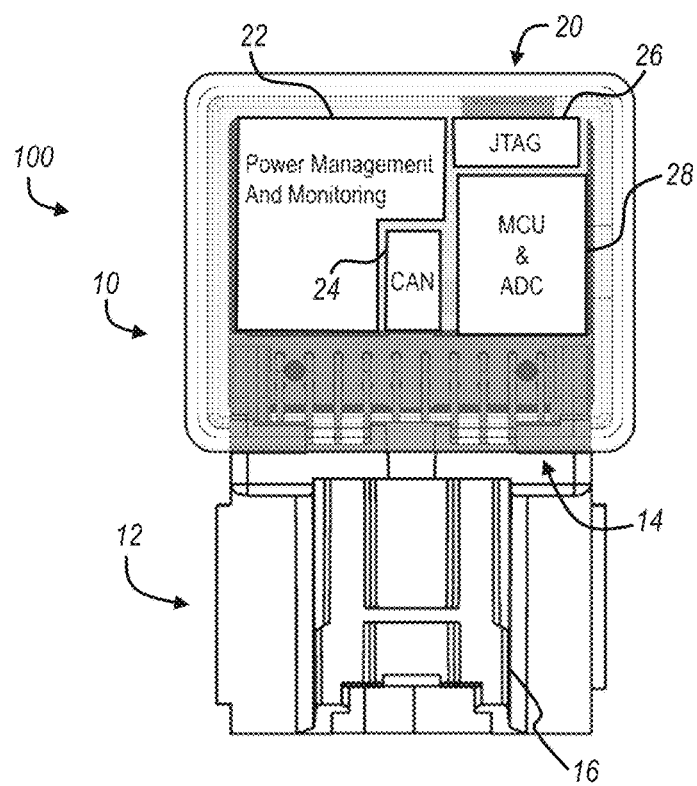
FIG. 7 is a schematic top view of the damper interface device of FIG. 1, showing a partial sectional view of section 5-5.

As shown in FIGS. 1-8, the DID 100 includes a housing 10 and a DID connector 12. The DID connector 12 is configured to receive the suspension connector 74, and to retain the suspension connector 74 connected to the DID connector 12, for example, using a connector latch 16. The DID connector 12 includes an electrical header 14 (see FIG. 5), which in the example shown is a multiple pin header, for connecting to a mating electrical header 78 (see FIG. 14) of the suspension connector 74. See also FIG. 8, schematically illustrating connection of the DID electrical header 14 to the suspension electrical header 78 of the vehicle 72. The electrical header 14 can also be referred to herein as a DID header 14 or a DID electrical header 14. The electrical header 78 can also be referred to herein as a suspension header 78 or a suspension electrical header 78. The DID 100 defines one or more mounting surfaces 18 by which the DID 100 can be affixed to the vehicle 72 after connection of the DID 100 to the suspension connector 74. The housing 10 includes a programming connector 20, which in one example is configured as a Joint Test Action Group (JTAG) connector 20 for receiving programming input to the DID 100, via a programming module 26 contained within the housing 10, where the programming module 26 can be configured as a JTAG module 20. In one example, the programming module 26 can be configured for wireless programming capability, such that the DID 100 can be reprogrammed wirelessly, for example, over Bluetooth®. As shown in FIG. 7, the housing 10 houses the programming module 26, a communications transceiver 24, a power management and monitoring (PMM) module 22, an analog to digital converter (ADC) 28, and a microcontroller unit (MCU) 30. In the example shown, the communications transceiver 24 can be configured as a Controller Area Network (CAN) transceiver. The microcontroller unit 30, also referred to herein as a microcontroller 30, includes a memory 32 and a processor (CPU) 34. One or more algorithms, including at least one emulation algorithm 40, 50, 60 is stored to the memory 32. In one example, one of the algorithms is configured to parse messages received from the vehicle network 80 via the transceiver 24, to determine contents of a response to the message. In one example, one of the algorithms is configured to start a response timer upon receiving an interrupt associated with an input message directed to the suspension controller 36, and to output a response message at an expiration time set by the response timer, such that each response message outputted from the DID 100 is outputted after a standard amount of time from the time each input message is received. As such, the DID 100 response time is predictably consistent, as compared with, for example, the response time of a system operating on a polling basis rather than the interrupt method used by the DID 100 to monitor for incoming CAN messages.

The microcontroller 30 includes a processor 34 for executing the one or more algorithms which can include algorithms 40, 50, 60. The memory 32, at least some of which is tangible and non-transitory, may include, by way of example, ROM, RAM, EEPROM, etc., of a size and speed sufficient, for example, for executing the algorithms 40, 50, 60, storing instructions including programming received via the programming module 26, and/or communicating with the PMM module 22, the transceiver 24, the programming module 26, and/or the ADC 28. In one example, the instructions stored to the memory 32 and/or received via the programming module 26 can include one or more configuration messages and/or module configurations which are executable of one or more of the modules 36, 82, 84 to modify, reconfigure and/or reprogram the one or more of the modules 36, 82, 84, as further described herein.

The DID connector 12 including the DID header 14, is configured to allow the DID 100 to interface with the vehicle network 80 via an Original-Equipment style connection for voltage regulator power supply, e.g., for power transfer, and for microcontroller network communication including signal transfer. The DID connector 12 can also be referred to herein as a vehicle bus connector. The DID connector 12 is configured to duplicate and/or be substantially similar to connector interface of the network connector 38 of the suspension controller 36, to allow for seamless installation of the DID 100 to the vehicle 72, e.g., to allow for mating connection of the DID connector 12 to the suspension connector 74 of the network cable assembly 76.

The PMM module 22, which can also be referred to as a voltage regulator, receives, when the DID 100 is connected to the suspension connector 74, raw (unregulated) vehicle bus voltage via the network cable assembly 76 and regulates the voltage into a constant power supply for powering the microcontroller 30. In one example, the PMM module 22 receives raw vehicle bus voltage between 6V-48V DC from the vehicle network 80, and regulates it into a constant 3.3V and 5V supply for the microcontroller 30.

The CAN transceiver 24 interfaces between the vehicle communication bus, e.g., the cable assembly 76, and the microcontroller 30. The transceiver 24 monitors and effectively arbitrates the messages that are transferred onto the network 80, to listen for CAN messages directed to the suspension controller 36, which can be identified, in one example, by an interrupt detected by the transceiver 24, thus moving the input message immediately to the microcontroller 30, as compared with, for example, a message detection method based on periodic polling of the network messages.

The microcontroller 30, in one example, is a programmable chipset that receives regulated electrical power from the PMM module 22 and network messages from the CAN transceiver 24. The microcontroller 30 is configurable and/or programmable to create the corresponding status messages for the given application. The programming connector 20 with the programming module 22 provides a direct interface to write software into the electrically erasable programmable read only memory (EEPROM) of memory 32 of the microcontroller 30, including for example, one or more algorithms 40, 50, 60, one or more configuration messages, and/or one or more vehicle module configurations, as further described herein.

The analog to digital converter (ADC) 28 receives analog signals and converts them to digital measurements for processing by the microcontroller 30. In one example, the ADC 28 measures source voltage from the vehicle network 80 to enable a software-based fault handling strategy, as shown in FIG. 10. In one example, the ADC 28 can identify physical sensors 86 installed on the vehicle (such as suspension sensors 86, which can include ride height sensors 86) to expand the software-based fault handling strategy, as shown in FIG. 11. In one example, the ADC 28 can identify physical modules installed on the vehicle, such as suspension control module 36, diagnostics module 82, and/or other control modules 84 installed on the vehicle. The other control modules 84 can include, for example, one or more of a cluster module, such as an instrument cluster module, a body control module, a powertrain control module, an engine control module, a transmission control module, a braking control module, a navigation module, etc.

The block diagram flow chart shown in FIG. 8 shows the function of the DID 100. In one configuration of the DID 100, the components 22, 24, 26, 28 are integrated into a printed circuit board to provide a robust communication framework, for use in vehicle operating conditions. As shown in FIG. 8, the PMM module 22, the transceiver 24, and the ADC 28 each connect to the vehicle network 80 via the DID electrical header 14 of the DID connector 12. The microcontroller 30 connects to the vehicle network 80 via the transceiver 24. When installed in the vehicle 72, the DID electrical header 14 of the DID connector 12 interfaces directly into the main vehicle network 80, by connecting to the mating suspension electrical header 78 of the suspension connector 74 of the cable assembly 76 as shown in FIG. 8 and illustrated in the schematic illustrations of FIGS. 14-15.

Once the DID 100 is connected into the vehicle 72 via the DID connector 12 connecting to the suspension connector 74, and the vehicle 72 is powered on, the raw vehicle voltage is regulated by the PMM module 22 to a 3.3V and 5V output for the microcontroller 30. When the microcontroller 30 receives a regulated supply voltage, the embedded software functions of the microcontroller 30 are permitted to operate. Further, communication with the vehicle network 80 via the CAN transceiver 24 is initiated, and the CAN transceiver 24 is then capable of arbitrating (transmitting, receiving) messages from the vehicle bus, e.g., the vehicle network 80, with the microcontroller 30.

In addition to the receiving data from the CAN transceiver 24, the microcontroller 30 receives data from the analog to digital converter (ADC) 28. The ADC 28 provides the microcontroller 30 with state estimations to enable a software-based fault handling strategy, via one or more of the algorithms stored to the microcontroller 30. For example, the microcontroller 30 will detect if the vehicle voltage is within an operating range to function, or detect if a semi-active suspension component (such as a ride height sensor 86) is installed on the vehicle 72.

The programming connector 20 provides a direct interface to the programming module 26, which, for example, can be a JTAG programming module. The programming connector 20 provides a direct interface to the microcontroller 30 for programming and troubleshooting purposes. The programming connector 20 enables the programmable memory (EEPROM) included in memory 32 to be modified for various applications of the DID 100, such that the DID 100 can be programmed and/or reprogrammed as required for deployment in various vehicle configurations, in response to changes in vehicle configuration, etc. As such, the DID 100 is advantageously configured as a universal (applicable with programming to multiple vehicles and vehicle configurations) and re-deployable (from one vehicle to another with reprogramming) device. In one example, a DID 100 can be programmed according to the configuration of a first vehicle, and installed to the first vehicle to emulate the OE semi-active damping system of the first vehicle. In the present example, the DID 100 installed to the first vehicle can be reprogrammed in response to changes in the configuration of the first vehicle. In the present example, the DID 100 installed to the first vehicle can be reprogrammed according to the configuration of a second vehicle, such that the DID 100 can be removed from the first vehicle and redeployed to the second vehicle. In one example, the first and second vehicles have different configurations.

Referring to FIGS. 9-11, shown are various software strategies which can be incorporated into the DID 100 to emulate the OE semi-active damping system to the vehicle network 80, when the DID 100 has been connected to the suspension connector 74. These software strategies can be incorporated into one or more algorithms and/or instructions programmed to the memory 32 and executable by the processor 34 of the microcontroller 30. FIGS. 9-11 illustrate examples of software strategies and/or algorithms which can be executed by the DID 100 to emulate the OE semi-active damping system to the vehicle network 80, including, an example emulation algorithm 40, another example emulation algorithm 50 with error monitoring, and another example emulation algorithm 60 with analog suspension position and voltage monitoring. The examples are non-limiting, and it would be understood that other software strategies and/or algorithms can be used to emulate the OE semi-active damping system to the vehicle network 80, including iterations of the algorithms 40, 50, 60 to adapt to changes in vehicle suspension configurations, vehicle network communication protocol, and/or vehicle diagnostic and condition state message requirements. Advantageously, iterations of the algorithms can be programmed to the DID 100 over time, as changes in the vehicle requirements are implemented, such that the DID 100 can be updated to maintain compatibility with vehicle changes. In particular, the use of a programmable microcontroller 30 allows the device to be modular across multiple original equipment manufacturer platforms.

In terms of functional states, the DID 100 provides one primary functional state to the vehicle network 80 when installed to the vehicle 72. The use of one primary functional state omits the requirements for an onboard status indicator on the DID 100. If the DID 100 exits its functional state for any reason, an error message and/or fault code is outputted to the network 80, notifying the vehicle network 80, including, for example, the original equipment onboard diagnostics (OBD) system, that the DID 100 has exited its functional state.

Referring to FIG. 9, shown is an example emulation strategy, which in a non-limiting example can be implemented in the DID 100 as an algorithm 40 stored to and executable by the microcontroller 30. As shown in FIG. 9 at 42, the microcontroller 30 is initialized. The microcontroller 30 can be first initialized when raw voltage is received by the PMM module 22 from the vehicle network 80, for example, when the vehicle 72 is powered on, and converted by the PMM module 22 to the microcontroller 30. At 44, the microcontroller 30, via the transceiver 24, listens for CAN messages from the vehicle network 80. When an input message directed to the suspension controller 36 is detected by the transceiver 24, the microcontroller 30 initiates processing of the input message immediately. In one example, the transceiver 24 detects an interrupt associated with the input message, such that the microcontroller 30 in response to the interrupt, immediately initiates processing of the input message. At 46, the microcontroller 30 starts a response timer, which sets an expiration time for the microcontroller 30 to output a response message to the vehicle network 80. At 46, the microcontroller 30 parses the input message and determines the contents for the appropriate response to the input message. The appropriate response can be one of an actual response originating from the vehicle, and an emulated response originating from the DID 100. The actual response, for example, can include a response defined by vehicle sensor input received by the microcontroller 30 from one or more vehicle sensors 86 such as suspension sensors 86 connected to the DID 100 via the cable assembly 76 and suspension connector 74, where the suspension sensors 86 are configured to sense an actual vehicle condition or condition state. An emulated response, as used herein, is the response which would have been outputted from the vehicle suspension controller 36 when the suspension controller 36 was connected to the vehicle network 80, e.g., when the suspension connector 74 was connected to the network connector 38, and when the semi-active dampers were installed to the vehicle 72 and connected to the suspension controller 36 via the cable assembly 76 and suspension connector 74, where the emulated response is generated by the DID 100 to emulate the response which would have been outputted from the vehicle suspension controller 36. At 46, the microcontroller 30 generates the response message including the contents for the appropriate response to the input message. At 48, at the expiration time set by the response timer, the microcontroller 30 sends the response message to the vehicle network 80, via the transceiver 24. Subsequent to sending the response message to the vehicle network 80, and in the present example, to at least one control module 84 connected to the vehicle network 80, the control module 84, via the vehicle network 80 sends corresponding feedback to the microcontroller 30, where the feedback identifies whether the appropriate response is the correct response. The control module 84 can be one of a plurality of control modules 84 in the vehicle 72, which can include, for example, a cluster module, a powertrain control module, a body control module, the suspension controller 36, etc. The DID 100, after sending the response to the vehicle network 80, continues, at 44, to listen for a subsequent input message from the vehicle network 80. In this manner, monitoring of the vehicle network 80 for input messages and/or associated interrupts is continuous, and the response time of the DID 100 to each input message received by the DID 100 is repeatable and consistent, as determined by the expiration time and controlled by the response timer.

Referring to FIG. 10, shown is an example emulation strategy including error monitoring, which in a non-limiting example can be implemented in the DID 100 as an algorithm 50 stored to and executable by the microcontroller 30. As shown in FIG. 10 at 52, the microcontroller 30 is initialized. The microcontroller 30 can be first initialized when raw voltage is received by the PMM module 22 from the vehicle network 80, for example, when the vehicle 72 is powered on, and converted by the PMM module 22 to the microcontroller 30. At 54, the microcontroller 30, via the PMM module 22, monitors the voltage level incoming from the vehicle network 80 to detect an input message incoming to the DID 100. When an input message directed to the suspension controller 36 is detected, the microcontroller 30 initiates processing of the input message immediately, as described for algorithm 40 of FIG. 9. At 56, the microcontroller 30 starts a response timer, which sets an expiration time for the microcontroller 30 to output a response message to the vehicle network 80. At 66, the microcontroller 30 parses the input message and determines the contents for the appropriate response to the input message, where, as previously described, the appropriate response can be one of an actual response defined by an actual vehicle condition, and an emulated response originated from the DID 100. At 56, the microcontroller 30 generates the response message including the contents for the appropriate response to the input message. At 58, at the expiration time set by the response timer, the microcontroller 30 sends the response message to the vehicle network 80, via the transceiver 24. Subsequent to sending the response message to the vehicle network 80, and in the present example, to a control module 84 connected to the vehicle network 80, the control module 84, via the vehicle network 80 sends corresponding feedback to the microcontroller 30, where the feedback identifies whether the appropriate response is the correct response. The DID 100, after sending the response to the vehicle network 80, continues, at 54, to monitor voltage level to detect a subsequent input message from the vehicle network 80. In this manner, monitoring of the vehicle network 80 for input messages and/or associated interrupts is continuous, and the response time of the DID 100 to each input message received by the DID 100 is repeatable and consistent, as determined by the expiration time and controlled by the response timer.

Referring to FIG. 11, shown is an example emulation strategy including analog suspension position monitoring and voltage monitoring, which in a non-limiting example can be implemented in the DID 100 as an algorithm 60 stored to and executable by the microcontroller 30. As shown in FIG. 11 at 62, the microcontroller 30 is initialized. The microcontroller 30 can be first initialized when raw voltage is received by the PMM module 22 from the vehicle network 80, for example, when the vehicle 72 is powered on, and converted by the PMM module 22 to the microcontroller 30. At 64, the microcontroller 30 enters a software-based fault handling routine for two operating conditions, including monitoring for state conditions of the incoming voltage and the suspension sensors 86, and monitoring for CAN message conditions.

For the state based conditions, the algorithm 60 at 66 monitors analog voltage level. If the voltage level determined at 66 to be unsatisfactory, e.g., outside of normal limits, the algorithm 60 continues to 70 and outputs a response message to the vehicle network 80, where the response message can include an error message and/or the condition state of the voltage level, including an indicator of the actual analog voltage detected at 66. Normal limits, as that term is used herein, can, for example, correspond to specification limits, limits based on historical performance, or other predetermined limits which can be, for example, provided to the microcontroller 30 from the memory 32 or via the vehicle network 80. The algorithm 60 returns to 64 and continues the routine.

If the voltage level determined at 66 is within normal limits, the algorithm 60 continues to 68 and monitors analog suspension sensors 86 connected to the DID 100 via the cable assembly 76 and the suspension connector 74. In the present example, the suspension sensors 86 can include one or more suspension position sensors 86 such as ride height sensors 86. If the sensor input received from the suspension sensors 86 is determined to be satisfactory, then the corresponding successful message, for example, indicating a functional status of the sensors 86, is generated by the microcontroller 30 and is outputted to the vehicle network 80 at 70. If the sensor input it is considered unsatisfactory, for example, outside of normal limits, then an error message is generated by the microcontroller 30 and outputted to the vehicle network 80. In one example, the response message generated by the microcontroller 30 can include an indicator of the actual sensor input received from the vehicle suspension sensor 86, for example, a position or ride height measurement. The algorithm 60 returns to 64 and continues the routine.

For the CAN message conditions, the algorithm 60 proceeds from 64 to 44, and monitors the network 80 to identify messages received from the cluster at 44. As described for algorithm 40 shown in FIG. 9, when an input message directed to the suspension controller 36 is detected by the transceiver 24 at 44, the microcontroller 30 initiates processing of the input message immediately. At 46, the microcontroller 30 starts a response timer, which sets an expiration time for the microcontroller 30 to output a response message to the vehicle network 80. At 46, the microcontroller 30 parses the input message and determines the contents for the appropriate response to the input message. The appropriate response can include at least one of an actual response determined by an actual or sensed vehicle condition, and an emulated response generated by the DID 100 using at least one emulation algorithm 40, 50, 60. At 46, the microcontroller 30 generates the response message including the contents for the appropriate response to the input message. At 48, at the expiration time set by the response timer, the microcontroller 30 sends the response message to the vehicle network 80, via the transceiver 24. Subsequent to sending the response message to the vehicle network 80, and in the present example, to a control module 84, connected to the vehicle network 80, the control module 84, via the vehicle network 80 sends corresponding feedback to the microcontroller 30, where the feedback identifies whether the appropriate response is the correct response. The algorithm 60, after sending the response to the vehicle network 80, returns to 64 and continues the routine.

In one example, the damper interface device 100 can include a one or more vehicle module configurations and/or configuration messages stored to the memory 32 of the microcontroller 30. In one example, each configuration message includes a configuration for at least one of the vehicle control modules 36, 82, 84 of the vehicle 72. In one example, one or more vehicle module configurations are stored to the memory 32 and memory 32 further includes at least one algorithm configured to select a vehicle module configuration and generate a configuration message including the vehicle module configuration for a respective vehicle control module, which may be one of the control modules 36, 82, 84, which can be outputted by the microcontroller to the respective vehicle control module via the vehicle network 80. The microcontroller 30 can be configured to detect the respective control module via the vehicle network 80, and output the respective configuration message to the respective control module, where the respective configuration message is received by the respective control module and executed to reprogram the respective control module from its current configuration to the respective configuration included in the respective configuration message. More than one configuration message can be stored to the memory 32 of the damper interface device 100, such that the microcontroller 30 can output a second configuration message to the respective control module to reprogram the respective control module from the first configuration to a second configuration included in the second configuration message. In one example, the second configuration is equivalent to the configuration which was current at the time the module was reprogrammed to the first configuration, such that, by reprogramming the respective vehicle control module to the second configuration, the respective vehicle control module is reprogrammed to the configuration that was current prior to being reprogrammed to the first configuration.

In one example, the configurations and/or configuration messages are inputted to the memory 32 of the microcontroller 30 via the programming module 26. In one example, the programming module 26 is configured as a JTAG module. In one example, the programming module 26 is configured for wireless programming, for example, via Bluetooth®, such that configurations and/or configuration messages can be transmitted wirelessly to the DID 100. In one example, the DID 100 is configured to read the current configuration of a respective control module at the time the DID 100 detects the respective control module, where the respective control module can be, for example, a selected one of the control modules 36, 82, 84, and to store the current configuration in memory 32, where storing the current configuration in memory 32 includes associating the current configuration in memory 32 with the respective control module. In one example, storing the current configuration in memory 32 can include time stamping the current configuration with the time the current configuration was detected and/or stored. In the present example, the DID 100 can output a configuration message to the respective module where the configuration message includes a modified configuration for configuring the respective module, and where the configuration message is executable by the respective module to reconfigure, e.g., reprogram, the respective module from the current configuration to the modified configuration. In one example, the current configuration corresponds to the OE configuration of the respective control module.

By way of illustration, in a non-limiting example the respective control module can be a vehicle control module 84 which is detected by the DID 100, where the DID 100 outputs a configuration message including a modified configuration to the control module 84 which is executable by the control module 84 to modify the configuration of the control module 84 from a current configuration where the control module 84, in the illustrative example, actuates folding of the side mirrors of the vehicle inward only upon actuation of a driver controlled switch in communication with the control module 84, to a modified configuration where the control module 84 reprogrammed with the modified configuration actuates folding of the side mirrors inward when the vehicle network indicates the vehicle is in "Park" mode and the vehicle doors are in locked position. The illustrative example is non-limiting, such that other vehicle parameters, operations, features and settings could be modified by reprogramming one or more of the vehicle modules 36, 82, 84 with a modified configuration using the method described herein. Modifying the configuration of one or more of the vehicle modules 36, 82, 84 using the DID 100 as described herein is advantaged by enabling modification of the module configuration without requiring the use and expense of separate and/or specialized diagnostic and/or scanning tool and/or communication cables for separate connection to the vehicle network 80.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of 'comprising' and "including" to provide more specific embodiments and are also disclosed. As used in this disclosure and in the appended claims, the singular forms "a", "an", "the", include plural referents unless the context clearly dictates otherwise.

The detailed description and the drawings or figures are supportive and descriptive of the disclosure, but the scope of the disclosure is defined solely by the claims. While some of the best modes and other illustrative examples for carrying out the claimed disclosure have been described in detail, various alternative designs and example configurations exist for practicing the disclosure defined in the appended claims. Furthermore, the examples shown in the drawings or the characteristics of various examples and/or configurations mentioned in the present description are not necessarily to be understood as embodiments independent of each other. Rather, it is possible that each of the characteristics described in one of the examples can be combined with one or a plurality of other desired characteristics from other example configurations, resulting in other examples not described in words or by reference to the drawings. Accordingly, such other examples and/or configurations fall within the framework of the scope of the appended claims.

The invention claimed is:

1. A damper interface device (DID) comprising:
   a microcontroller including a memory and a processor;
   at least one algorithm stored to the memory;
   a DID connector configured to connect the microcontroller to a vehicle network of a vehicle;

wherein the microcontroller is configured to receive messages from the vehicle network via the DID connector;
wherein the messages include at least one input message directed to a suspension controller; and
wherein the at least one algorithm is executed by the processor to:
identify the at least one input message as directed to the suspension controller;
parse the at least one input message for response requirements;
determine contents of a response to the at least one input message;
wherein the contents of the response emulate a response of the suspension controller;
generate a response message including the contents of the response;
wherein the microcontroller is configured to output the response message to the vehicle network via the DID connector;
wherein:
the contents of the response comprise a condition state of a semi-active damper; and
the condition state indicates a functional status of the semi-active damper.

2. The damper interface device of claim 1, further comprising:
a network transceiver configured to receive the messages from the vehicle network and to output the response message to the vehicle network; and
wherein the network transceiver is in communication with the microcontroller and the DID connector.

3. The damper interface device of claim 2, wherein the network transceiver is configured to receive an interrupt from the vehicle network; and
wherein the interrupt is associated with the at least one input message.

4. The damper interface device of claim 1, further comprising:
a programming module;
wherein the memory includes a programmable memory; and
wherein the at least one algorithm is stored to the programmable memory via the programming module.

5. The damper interface device of claim 1, wherein:
the microcontroller, via the DID connector, is configured to:
monitor a voltage level incoming from the vehicle network; and
detect the at least one input message using the voltage level.

6. The damper interface device of claim 1, wherein the at least one algorithm is executed by the processor to:
monitor an analog voltage level defined by a condition state of the vehicle; and
output a response message to the vehicle network;
wherein the response message includes at least one of:
a voltage error message when the analog voltage level is outside of normal limits; and
the condition state.

7. The damper interface device of claim 1, wherein the at least one algorithm is executed by the processor to:
start a response timer upon receiving the at least one input message;
wherein the response timer sets an expiration time; and
wherein the microcontroller is configured to output the response message to the vehicle network at the expiration time.

8. The damper interface device of claim 1, further comprising:
a first configuration message stored to the memory;
wherein the first configuration message includes a first configuration for a vehicle module of the vehicle;
wherein the microcontroller is configured to:
detect the vehicle module via the vehicle network; and
output the first configuration message to the vehicle module, via the DID connector and vehicle network; and
wherein when detected, the vehicle module is configured with a current module configuration;
wherein the first configuration message is executable by the vehicle module to reconfigure the vehicle module from the current module configuration to the first configuration.

9. A damper interface device (DID) comprising:
a microcontroller including a memory and a processor;
at least one algorithm stored to the memory;
a DID connector configured to connect the microcontroller to a vehicle network of a vehicle;
wherein the microcontroller is configured to receive messages from the vehicle network via the DID connector;
wherein the messages include at least one input message directed to a suspension controller; and
wherein the at least one algorithm is executed by the processor to:
identify the at least one input message as directed to the suspension controller;
parse the at least one input message for response requirements;
determine contents of a response to the at least one input message;
wherein the contents of the response emulate a response of the suspension controller;
generate a response message including the contents of the response;
wherein the microcontroller is configured to output the response message to the vehicle network via the DID connector;
the DID connector configured to connect the microcontroller to a suspension
sensor of the vehicle, and to receive a sensor input from the suspension sensor;
wherein:
the contents of the response include a condition state of the suspension sensor; and
the condition state is determined by the at least one algorithm using the sensor input.

10. The damper interface device of claim 9, wherein:
the sensor input includes one of a vehicle position measurement and a vehicle ride height measurement; and
the response message includes the one of the vehicle position measurement and the vehicle ride height measurement.

11. A damper interface device (DID) comprising:
a microcontroller including a memory and a processor;
at least one algorithm stored to the memory;
a DID connector configured to connect the microcontroller to a vehicle network of a vehicle;
wherein the microcontroller is configured to receive messages from the vehicle network via the DID connector;
wherein the messages include at least one input message directed to a suspension controller; and
wherein the at least one algorithm is executed by the processor to:

identify the at least one input message as directed to the suspension controller;
parse the at least one input message for response requirements;
determine contents of a response to the at least one input message;
wherein the contents of the response emulate a response of the suspension controller;
generate a response message including the contents of the response;
wherein the microcontroller is configured to output the response message to the vehicle network via the DID connector;
wherein the at least one algorithm is executed by the processor to:
start a response timer upon receiving the at least one input message;
wherein the response timer sets an expiration time; and
wherein the microcontroller is configured to output the response message to the vehicle network at the expiration time.

12. A damper interface device (DID) comprising:
a microcontroller including a memory and a processor;
at least one algorithm stored to the memory;
a DID connector configured to connect the microcontroller to a vehicle network of a vehicle;
wherein the microcontroller is configured to receive messages from the vehicle network via the DID connector;
wherein the messages include at least one input message directed to a suspension controller; and
wherein the at least one algorithm is executed by the processor to:
identify the at least one input message as directed to the suspension controller;
parse the at least one input message for response requirements;
determine contents of a response to the at least one input message;
wherein the contents of the response emulate a response of the suspension controller;
generate a response message including the contents of the response;
wherein the microcontroller is configured to output the response message to the vehicle network via the DID connector;
a first configuration message stored to the memory;
wherein the first configuration message includes a first configuration for a vehicle module of the vehicle;
wherein the microcontroller is configured to:
detect the vehicle module via the vehicle network; and
output the first configuration message to the vehicle module, via the DID connector and vehicle network; and
wherein when detected, the vehicle module is configured with a current module configuration;
wherein the first configuration message is executable by the vehicle module to reconfigure the vehicle module from the current module configuration to the first configuration.

13. The damper interface device of claim 12, further comprising:
a second configuration message stored to the memory;
wherein the second configuration message includes a second configuration for the vehicle module;
wherein the microcontroller is configured to output the second configuration message to the vehicle module, via the DID connector and vehicle network; and
wherein the second configuration message is executable by the vehicle module to reconfigure the vehicle module from the first configuration to the second configuration.

14. The damper interface device of claim 13, wherein the second configuration is equivalent to the current module configuration, such that reconfiguring the vehicle module from the first configuration to the second configuration reconfigures the vehicle module to the current module configuration.

15. The damper interface device of claim 12, further comprising:
a plurality of configuration messages stored to the memory;
the plurality of configuration messages including the first configuration message and at least a second configuration message;
wherein the second configuration message includes a second configuration for the vehicle module;
wherein the microcontroller is configured to:
detect the vehicle module via the vehicle network;
select one of the first and second configuration messages; and
output the selected one of the first and second configuration messages to the vehicle module, via the DID connector and vehicle network; and
wherein when detected, the vehicle module is configured with a current module configuration;
wherein the selected one of the configuration messages is executable by the vehicle module to reconfigure the vehicle module from the current module configuration to the selected one of the first and second configurations.

16. The damper interface device of claim 12, further comprising:
a programming module in communication with the microcontroller; and
the first configuration message is received by the microcontroller via the programming module.

17. A method comprising:
connecting a damper interface device (DID) to a vehicle network of a vehicle;
wherein the DID includes:
a microcontroller including a memory and a processor;
at least one algorithm stored to the memory; and
a DID connector configured to connect the microcontroller to the vehicle network;
receiving, via the microcontroller, messages from the vehicle network via the DID connector;
wherein the messages include at least one input message directed to a suspension controller; and
executing the at least one algorithm by the processor to:
identify the at least one input message as directed to the suspension controller;
parse the at least one input message for response requirements;
determine contents of a response to the at least one input message;
wherein the contents of the response emulate a response of the suspension controller; and
generate a response message including the contents of the response;
outputting from the microcontroller, via the DID connector, the response message to the vehicle network;
wherein:
the contents of the response comprise a condition state of a semi-active damper; and the condition state indicates a functional status of the semi-active damper.

18. The method of claim 17, further comprising:
executing the at least one algorithm by the processor to:
start a response timer upon receiving the input message;
wherein the response timer sets an expiration time; and
outputting at the expiration time, via the microcontroller, the response message to the vehicle network.

19. The method of claim 17, further comprising:
receiving an interrupt from the vehicle network;
wherein the interrupt is associated with the at least one input message.

20. The method of claim 17, further comprising:
monitoring a voltage level incoming from the vehicle network using the microcontroller; and
detecting the at least one input message using the voltage level.

21. The method of claim 17, further comprising:
executing the at least one algorithm to:
monitor an analog voltage level defined by a condition state of the vehicle; and
output a response message to the vehicle network;
wherein the response message includes at least one of:
a voltage error message when the analog voltage level is outside of normal limits; and
the condition state.

22. The method of claim 17, further comprising:
modifying the configuration of the vehicle from a first configuration to a second configuration; and
reprogramming the damper interface device to emulate the response of the suspension controller according to the second configuration.

23. A method comprising:
connecting a damper interface device (DID) to a vehicle network of a vehicle;
wherein the DID includes:
a microcontroller including a memory and a processor;
at least one algorithm stored to the memory; and
a DID connector configured to connect the microcontroller to the vehicle network;
receiving, via the microcontroller, messages from the vehicle network via the DID connector;
wherein the messages include at least one input message directed to a suspension controller; and
executing the at least one algorithm by the processor to:
identify the at least one input message as directed to the suspension controller;
parse the at least one input message for response requirements;
determine contents of a response to the at least one input message;
wherein the contents of the response emulate a response of the suspension controller; and
generate a response message including the contents of the response;
outputting from the microcontroller, via the DID connector, the response message to the vehicle network;
connecting, via the DID connector, the microcontroller to a suspension sensor of the vehicle;
receiving to the microcontroller, a sensor input from the suspension sensor;
wherein:
the contents of the response include a condition state of the suspension sensor; and
the condition state is determined by the at least one algorithm using the sensor input.

24. The method of claim 23, wherein:
the sensor input includes one of a vehicle position measurement and a vehicle ride height measurement; and
the response message includes the one of the vehicle position measurement and the vehicle ride height measurement.

25. A method comprising:
connecting a damper interface device (DID) to a vehicle network of a vehicle;
wherein the DID includes:
a microcontroller including a memory and a processor;
at least one algorithm stored to the memory; and
a DID connector configured to connect the microcontroller to the vehicle network;
receiving, via the microcontroller, messages from the vehicle network via the DID connector;
wherein the messages include at least one input message directed to a suspension controller; and
executing the at least one algorithm by the processor to:
identify the at least one input message as directed to the suspension controller;
parse the at least one input message for response requirements;
determine contents of a response to the at least one input message;
wherein the contents of the response emulate a response of the suspension controller; and
generate a response message including the contents of the response;
outputting from the microcontroller, via the DID connector, the response message to the vehicle network;
storing a configuration message to the memory;
wherein the configuration message includes a modified configuration of a vehicle module of the vehicle;
detecting the vehicle module via the vehicle network using the microcontroller;
wherein when detected, the vehicle module is configured with a current module configuration;
outputting the configuration message to the vehicle module, via the DID connector and the vehicle network;
wherein the configuration message is executable by the vehicle module to reconfigure the vehicle module from the current module configuration to the modified configuration.

26. A damper interface device (DID) comprising:
a microcontroller including a memory and a processor;
at least one algorithm stored to the memory;
a DID connector configured to connect the microcontroller to a vehicle network of a vehicle;
wherein the microcontroller, via the DID connector, is configured to:
monitor an analog voltage level incoming from the vehicle network;
receive a sensor input from a suspension sensor of the vehicle; and
receive messages from the vehicle network;
wherein the messages include at least one input message directed to a suspension controller; and
wherein the at least one algorithm is executed by the processor to:
identify the at least one input message as directed to the suspension controller;
parse the at least one input message for response requirements;
determine contents of a response to the at least one input message;

wherein the contents of the response include:
: a first response which emulates a response of the suspension controller; and
: a second response which is one of a sensor output defined by the sensor input, and an error message defined by the analog voltage level; and generate a response message including the contents of the response;

wherein the microcontroller is configured to output the response message to the vehicle network via the DID connector.

\* \* \* \* \*